Oct. 10, 1961     H. NOBLE     3,003,804
DEVICE FOR LOCATING AND SALVAGING SUNKEN LOGS
Filed Oct. 6, 1959

INVENTOR.
HENRY NOBLE
BY John W. Adams
ATTORNEY

United States Patent Office 3,003,804
Patented Oct. 10, 1961

3,003,804
DEVICE FOR LOCATING AND SALVAGING SUNKEN LOGS
Henry Noble, Box 117, Osage, Minn., assignor, by direct and mesne assignments, of four-twelfths to Jess J. Peifer, Park Rapids, four-twelfths to Louis Noeske, Osage, and one-twelfth to Theodore O. Colgrove, Osage, Minn.
Filed Oct. 6, 1959, Ser. No. 844,683
4 Claims. (Cl. 294—66)

This invention relates to devices for locating and salvaging sunken logs.

It is an object of this invention to provide a device for locating and salvaging sunken logs in which a downwardly pointed hook is towed across the bottom of a lake or other body of water by a cable communicating at the surface with a salvage boat or raft.

It is also an object to provide such a device in which a log clamping arm disposed forwardly of the hook is pivoted in the direction of the hook to firmly grip a sunken log engaged by the hook in moving across the bottom of the lake.

It is another object to provide such a device in which a buoyant member is attached to a forwardly projecting extension of the snagging hook is such a position to maintain the snagging hook, while being towed, in a downwardly pointing position with the curved portion of the hook disposed in a plane normal to the surface of the water.

It is a further object to provide such a device in which the shank of the hook is pivotally mounted between a pair of parallel vertical sleeve plates attached to opposite sides of the rear end of a rod forming an extension of the shank of the hook, and in which a shear pin connecting the hook to the plates normally holds the hook in rigid fixed relation to the shank extension.

It is a further object to provide such a device in which the shear pin is adapted to break and thereby permit the hook to pivot with respect to the shank extension to release the hook from snags upon immovable objects.

It is another object to provide such a log finding and salvaging device in which a towing cable is attached to the upper end portion of the clamping arm above the pivotal axis thereof and is passed through an eye attached to the front end of the shank extension and in which the log clamping arm is normally held away from the hook in retracted position by a coil spring interconnecting the arm below its pivotal axis and the buoyant tank member.

These and other objects and advantages of this invention will more fully appear from the following description made in connection with the accompanying drawing, wherein like reference characters refer to the same or similar parts throughout the several views, and in which.

Figure 1:
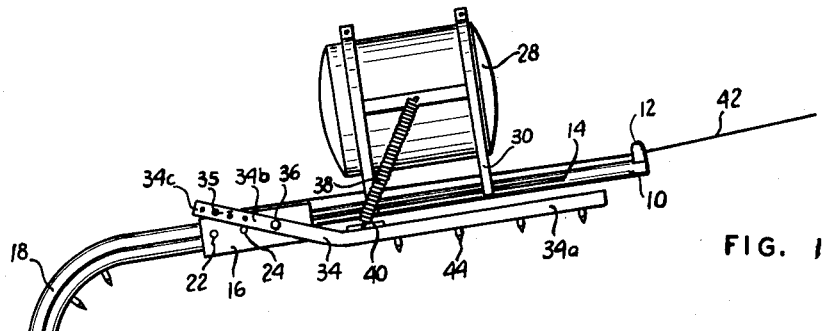
FIG. 1 is a side view of a device embodying the present invention shown in operative position for snagging sunken logs.

In the form of the invention shown in the accompanying drawing, a rigid elongated hook shank extension 10 is provided having an annular cable guide eye member 12 attached at right angles thereto at the front end thereof. A pair of generally parallel plates 14 extend respectively in opposite directions from opposite sides of the intermediate portion of the shank extension 10 in a plane containing the axis of the shank extension 10 and normal to the plane containing the annular guide eye 12. A pair of generally flat sleeve plates 16 are attached to the rear end of the shank extension 10 respectively on opposite sides thereof, disposed in normal relation to the plates 14, and extend beyond the rear end of the shank extension 10.

A pair of pivotally connected gripping jaw members are formed by an arcuate log snagging hook 18 and a log clamping member such as the arm 34.

The arcuate hook 18 has a pointed lower end 20 and is pivotally mounted at the shank thereof upon a bolt 22 extended through openings provided through the pair of plates 16. Pivotal movement of the hook 18 upon the bolt 22 is normally prevented by a shear pin 24 which passes through the shank of the hook 18 and is attached to each of the sleeve plates 16 to maintain the upper end portion of the hook 18 in general axial alignment with the shank extension 10. During operative use the arcuate portion of the hook is pointed downwardly and is disposed in a plane generally parallel to the sleeve plates 16 and normal to the plates 14, and the hook is towed along the bottom of the lake or other body of water with the point 20 thereof positioned to snag logs encountered thereby. The curved portion of the hook facing the center of the arc formed thereby is provided with a plurality of inwardly projecting teeth 26 designed to penetrate the bark of the snagged log and dig into the wood.

A buoyant air filled tank 28 is attached to the pair of plates 14 by a supporting frame 30, and the tank 28 when so mounted buoys up the front end of the shank extension 10 and positions the downwardly projecting arcuate hook 18 in a generally vertical plane. The frame 30 is removably bolted to the plates 14, and may be positioned with respect to the shank extension 10 to maintain the hook and the shank at the proper angle with respect to the lake bottom during operative use.

Figure 2:
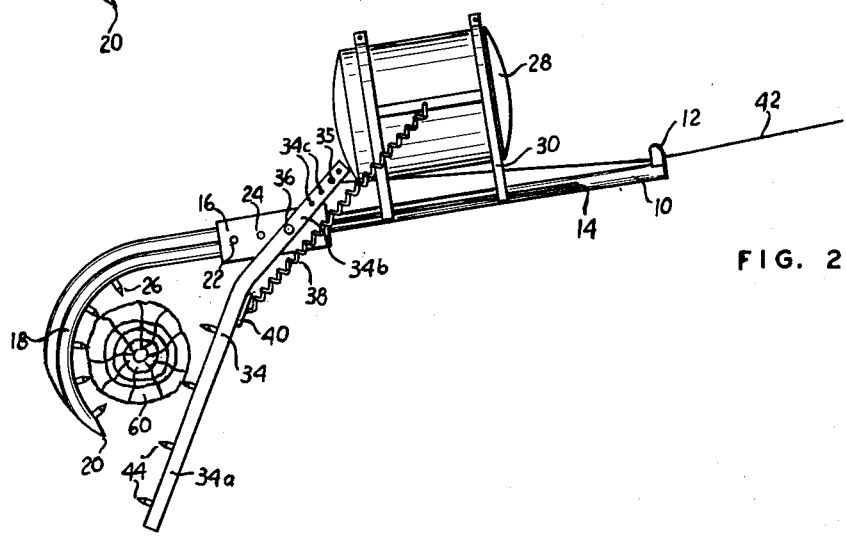
FIG. 2 is a side view of the device shown in FIG. 1 showing a sunken log firmly gripped thereby and ready to be towed to the surface of the water.
Figure 3:
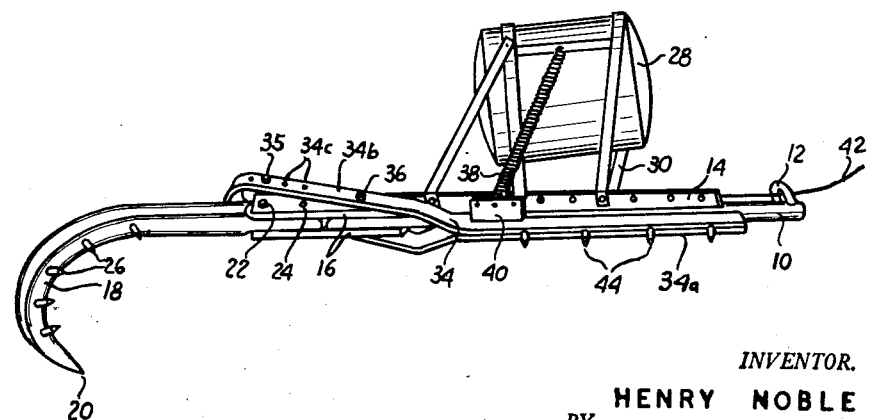
FIG. 3 is a perspective view showing the bottom of the device shown in FIG. 1.

The pivotal log clamping arm 34 is pivotally mounted upon a bolt 36 which passes through the rear end portion of the shank extension 10 and through the sleeve plates 16. The bolt 36 is positioned at an intermediate portion of the shank extension 10 and permits the arm 34 to pivot thereupon in the plane of the shank extension 10 and the hook 18. The lower portion 34a of the pivotal arm 34 disposed below the bolt 36 is normally maintained in abutment with the bottom of the shank extension 10 in a forward pointing direction by a coil spring 38 which is attached to a plate 40 mounted upon an intermediate portion of the arm 34 at one end thereof and which is mounted at the other end thereof to the frame 30 supporting the tank 28. The upper end portion 34b of the pivotal arm 34 is attached to the lower end of a towing cable 42 which extends therefrom forwardly through the cable guide eye 12 to the surface of the water where forward pulling pressure is exerted upon the upper end of the cable to tow the hook 18 across the bottom of the lake. The pulling force necessary for towing the hook across the bottom of the lake is normally insufficient to overcome the tension exerted by the spring 38 holding the lower end of the pivotal arm in open position against the bottom of the shank extension 10. When the hook 18 engages a log, increased pulling tension upon the upper end of the cable 42 pivots the upper end 34b of the pivotal arm 34 in a forward direction and pivots the lower end 34a thereof in a rearward direction, thereby stretching the coil spring 38 and engaging the forward disposed side of the log, designated by the numeral 60. A plurality of sharp teeth 44 are projected from the log engaging surface of the pivotal arm 34. Further increased dragging force exerted upon the cable 42 forces the teeth 44 of the arm 34 through the bark and into the wood of the log 60 to tightly grip the log between the curved portion of the hook 18 and the pivotal arm 34, as best shown in FIG. 2. The entire log salvaging device and the log is then pulled to the surface by the cable 42 by a winch or other appropriate means disposed upon a boat or raft from which the salvaging operation is conducted.

In the form of the invention shown, the amount of pulling force upon the towing cable 42 necessary to pivot the log clamping arm 34 to clamp against the hook is adjustable by varying the distance between the pivotal axis of the clamping arm 34 and the position at which the cable 42 is attached thereto. The lower end of the cable 42 is attached to a cable pin 35 which may be inserted through one of a plurality of pin openings 34c in the upper portion 34b of the arm 34 disposed respectively at different distances from the pivotal axis of the arm 34.

When the hook 18 snags a large rock or other extremely heavy or immovable object on the lake bottom, pulling force on the towing cable 42 is increased until the shear pin 24 is broken. The pulling force on the cable 42 then pivots the hook 18 upon the pivot bolt 22 and the hook 18 slides up and over the snag. The shear pin 24 may be of any desired strength to insure releasing the hook from snags without breaking the cable 42.

It will, of course, be understood that various changes may be made in the form, details, arrangements and proportion of parts without departing from the scope of my invention, which generally stated consists in the matter set forth in the appended claims.

What is claimed is:

1. A device adapted to be towed beneath the surface of a body of water for locating and facilitating the salvaging of sunken logs on the bottom, said device comprising a pair of pivotally connected gripping jaw members, one of said jaw members being formed with a log snagging hook disposed in a generally upstanding plane when being towed, a buoyant member connected to the upper portion of said hook to hold the same in upstanding relation during the towing operation, the other jaw being formed by a log clamping member disposed generally forwardly of said hook during the towing operation and having log clamping means formed thereon, a single tow line forming both the sole means for towing the device through the water and for actuating said jaw, said tow line being connected to said clamping member in spaced relation to the pivotal connection between said jaws in a manner whereby the towing force exerted by the tow line urges the clamping jaw toward the snagging hook and said device including resilient spring means retracting said clamping member and yieldably retaining the same in retracted position when the device is being towed through an unobstructed path beneath the surface of the water, said spring means yielding however in response to the snagging of a log by said hook during the towing operation to permit the additional tension produced in said tow line by the resistance thus exerted on said hook to positively swing said log clamping member jaw towards said snagging hook and positively clamp the engaged log between said jaws to permit raising and salvaging the log.

2. The structure set forth in claim 1 wherein said clamping member includes a substantially straight clamping jaw portion having a plurality of gripping teeth thereon and normally held by said spring means in retracted upwardly disposed position to provide a clear unobstructed path ahead of said snagging hook during the towing of the device through the water.

3. The structure set forth in claim 1 and said clamping member being intermediately pivoted to said hook to form an upwardly extending portion and said tow line being connected in spaced relation to the pivotal connection to said upwardly extending portion.

4. The structure set forth in claim 1 and a shank extending forwardly from the upper portion of said hook, a pivot pin connecting said shank and said hook and a second pin in the form of a shear pin connecting said shank and said hook in spaced relation to the pivot pin to normally lock said hook and said shank together as a unit, but permitting yieldable swinging movement of said hook upon shearing of said shear pin under excessive snagging force to permit release of said hook from a snagged rock or the like.

References Cited in the file of this patent

UNITED STATES PATENTS

| | | |
|---|---|---|
| 60,893 | Hoffeditz | Jan. 1, 1867 |
| 873,579 | Munn | Dec. 10, 1907 |
| 882,310 | Hathway | Mar. 17, 1908 |
| 929,539 | Bateman | July 27, 1909 |
| 1,086,491 | Weaver | Feb. 10, 1914 |
| 1,165,893 | Munn | Dec. 28, 1915 |
| 1,493,114 | Hodge et al. | May 6, 1924 |

FOREIGN PATENTS

| | | |
|---|---|---|
| 487,007 | Canada | Oct. 7, 1952 |
| 13,449 | Norway | Nov. 23, 1903 |
| 19,328 | Norway | Oct. 13, 1908 |
| 81,171 | Norway | Dec. 22, 1952 |